Nov. 11, 1924.

F. A. SEIFERT

METHOD OF CURING CONCRETE

Filed Nov. 25, 1922

1,514,936

INVENTOR
F.A. SEIFERT
BY E. E. Huffman
ATTORNEY

Patented Nov. 11, 1924.

1,514,936

UNITED STATES PATENT OFFICE.

FRANK A. SEIFERT, OF ST. LOUIS, MISSOURI.

METHOD OF CURING CONCRETE.

Application filed November 25, 1922. Serial No. 603,235.

*To all whom it may concern:*

Be it known that I, FRANK A. SEIFERT, a citizen of the United States of America, residing at the city of St. Louis, State of Missouri, have invented a certain new and useful Method of Curing Concrete, of which the following is such a full, clear, and exact description as will enable any one skilled in the art to which it appertains to make and use the same, reference being had to the accompanying drawings, forming part of this specification.

My invention relates to a method of curing concrete articles, particularly hollow cylindrical articles, such as pipes, parts and the like. As it has been found that the application of dry heated air to such articles for curing or hardening them causes great deterioration in their quality, it has been customary to either cure them without the application of artificial heat, or to place them in a steam room and cure by the application of heated air and steam. Both these processes are slow, the former requiring about twenty eight days and the latter at least forty eight hours to effectively cure and harden the article.

The object of my invention is to reduce the time necessary to cure the article by enclosing it in an air-tight receptacle, preferably the mold in which it is formed, together with a small quantity of water, the receptacle being then heated to cause the curing of the article entirely by the vapor generated in the interior.

Figure 1:
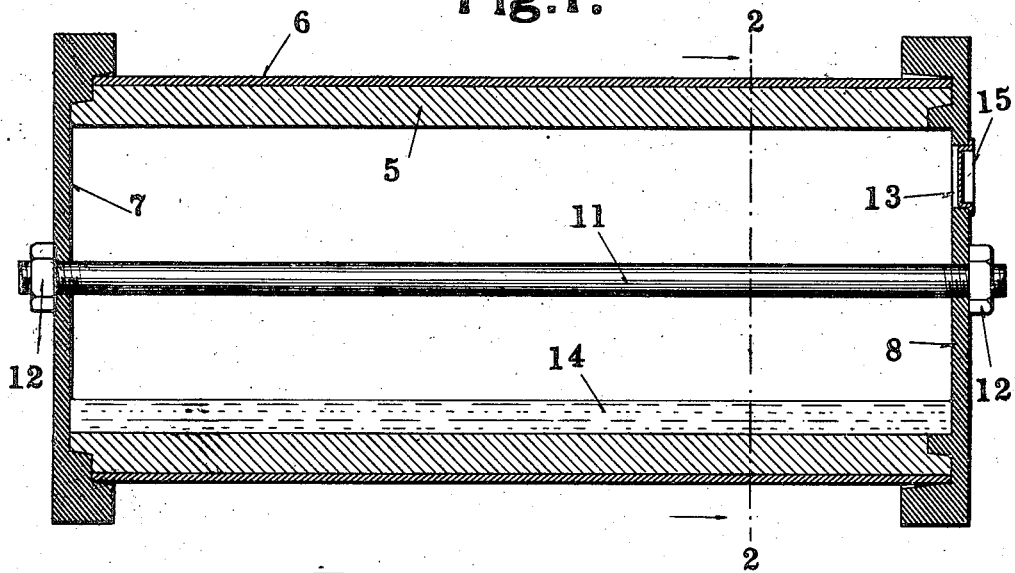
Figure 2:
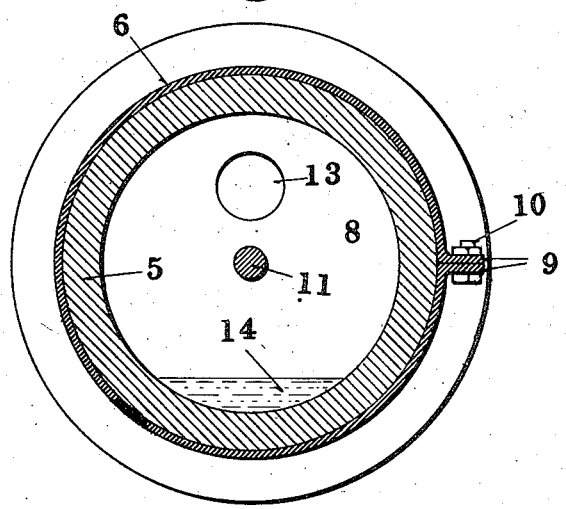

In the accompanying drawings which illustrate one form of apparatus for carrying out my method, Fig. 1 is a longitudinal section and Fig. 2 is a section taken on the line 2—2 of Fig. 1.

The article to be cured, which, as shown in the drawing, is a section of pipe 5, is formed in a mold comprising a cylindrical body of sheet metal 6 and a pair of heads 7 and 8, respectively. The body 6 is split along one side and provided with flanges 9 held together by bolts 10 to allow of the release of the finished article. The heads 7 and 8 are held against the ends of the body 6 by a rod 11 threaded at each end to receive nuts 12. One of the heads, as for example 8, has formed in it an opening 13 through which the concrete mixture is placed in the mold. The mold is rotated by any suitable means until the concrete is deposited in a uniform layer against the walls of the body 6. All the water contained in the mold is now drained off through the opening 13 as I have found that the chemicals contained in the water remaining in the mold after the deposition of the concrete on the walls has an injurious effect on the article. A small quantity of clear water 14 is now introduced and the opening 13 closed by means of a stopper 15 which should effectively prevent the entrance of air. The split along the side of the body as well as the joints between its head and body will be effectively sealed by the material of the pipe 5.

Heat is now applied to the exterior of the mold to vaporize the water 14 to cure the pipe 5. Both the degree of heat and length of time required will vary somewhat with the size of the article. I have found that with a pipe six inches in diameter and having walls five eighths of an inch in thickness, a temperature of one hundred and fifty degrees Fahrenheit applied for seven hours will be sufficient to thoroughly cure the article. It will be seen, therefore, that by my process, the length of time required for curing and hardening manufactures of cement is greatly reduced. Moreover, I find that my process causes no deterioration of the article cured. My process also reduces the cost of manufacture by lessening the number of molds necessary for a given output.

Having fully described my invention, what I claim as new and desire to secure by Letters Patent of the United States is:

1. The process of curing articles of cement which comprises sealing the article in a substantially air tight container together with a portion of water and heating the container to cure the article solely by the vapor generated in the interior of the container.

2. The process of curing articles of cement which comprises forming said articles in a mold, draining off the water, adding pure water, sealing the mold, and applying heat to the exterior of the mold to cure the article solely by the vapor generated in the interior of the mold.

3. The process of curing hollow articles of cement which comprises forming the article in a mold, draining off the water from the interior of the article, adding pure water, sealing the mold, and applying heat to the exterior of the mold to cure the article solely by vapor generated in the interior of the mold.

In testimony whereof, I have hereunto set my hand and affixed my seal.

FRANK A. SEIFERT. [L. S.]